United States Patent Office 3,514,354
Patented May 26, 1970

3,514,354
METHOD OF COATING SHEETS OF CARTON OR SIMILAR MATERIAL WITH A PLASTIC COATING
Nils Andersson, Lund, Sweden, assignor to AB Akerlund & Rausing, Lund, Sweden, a Swedish joint-stock company
Filed Mar. 20, 1967, Ser. No. 624,562
Claims priority, application Sweden, May 10, 1966, 6,380/66
Int. Cl. B29d 7/02; B32b 31/10
U.S. Cl. 156—244   7 Claims

ABSTRACT OF THE DISCLOSURE

A method of producing plastic coated sheets of carton material comprises the steps of feeding the sheets longitudinally of themselves in succession with the end portions of adjacent sheets in overlapped relation thereby establishing a marginal zone at one end of each sheet which is desired to remain uncoated. A continuous film of plastic is extruded onto one side of the end overlapped sheets which thereby serves to temporarily interconnect adjacent sheets. The sheets are thereafter separated by severing the plastic film transversely of the sheets along a zone adjacent an end of one sheet where the film is not adhered to either sheet as a result of the overlap.

Figure 1:
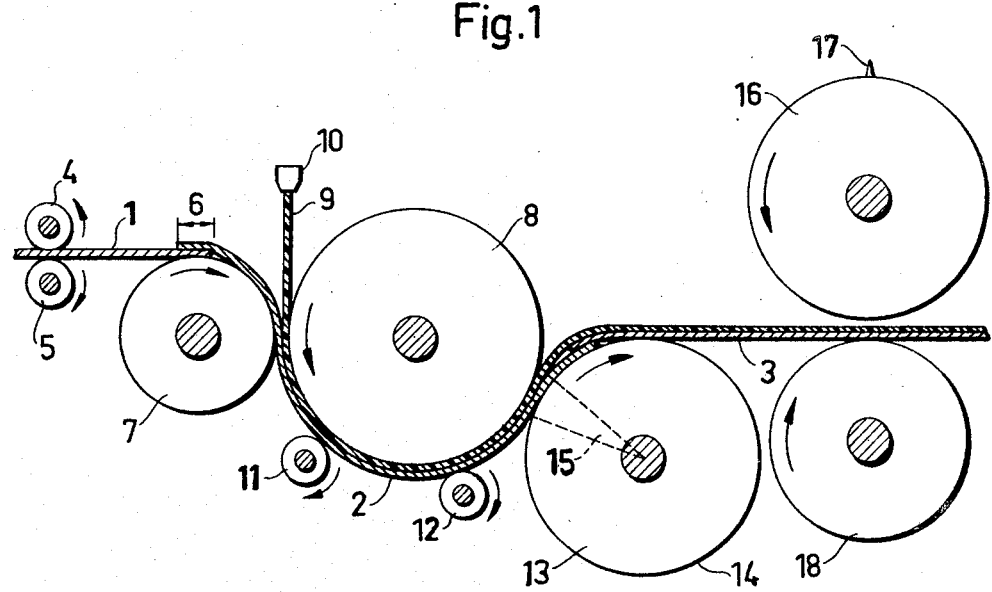

For carrying out the method, feed rollers carry the end overlapped sheets in succession into the nip between a rubber roller and a steel roller, and a continuous plastic film is extruded into the nip to form a laminate with the end overlapped sheets. The steel roller serves to cool the plastic film and a suction roller is provided to pull the plastic film away from the surface of the steel roller. After leaving the steel roller, the sheets which are temporarily joined together by the continuous plastic film are separated by a cutter device which cuts transversely through the film, the operation of the cutter device being synchronized with the longitudinal movement of the sheets such that a cut is made along a zone adjacent an end of one sheet where the film is not adhered to either sheet as a result of the overlap.

---

The present invention relates to a method of coating sheets of carton or similar material, which is characterized by feeding the sheets in succession into the nip between two pressing rollers, the end portions of adjacent sheets overlapping each other within a narrow marginal zone, simultaneously coating the sheets so overlapped with a plastic film extruded from an orifice, and thereafter separating the sheets so that the margin which has been overlapped at the coating proper by the preceding or the subsequent coated sheet is kept free from plastic, so that the said margin may serve as a guide means at the subsequent treatment of the sheet, e.g. printing, punching, or the like.

The purpose of the invention is consequently to permit plastic coating of both large and small sheets while keeping at least one margin completely free from plastic in such a way that the said margin may later serve as a guide, e.g. at the punching of the sheets. Through the invention it becomes possible inter alia to coat sheets with plastic both before and after the printing thereof. Furthermore, it becomes possible to let the subsequent punching take place in careful registry with the print on the sheet.

Preferably, the leading end margin of a sheet is caused, when being fed into the said roller nip, to become inserted below the trailing end margin of a preceding sheet prior to the lamination of the plastic film in such a way that the said forward margin is kept free from plastic. The two pressing rollers may for instance consist of a rubber roller and a steel roller for cooling. This may entail a risk of causing the sheets to adhere with their plastic coated side to the cooling roller. In order to prevent this, it is possible according to the invention to remove the plastic coated sheets from the cooling roller by means of a suction roller provided with perforations and connected to a vacuum source. Alternatively, it is possible to use various kinds of suction orifices for the same purpose. In other cases it may be possible to ue a rake for the same purpose.

After coating the overlapping sheets with plastic, the plastic film has to be cut. This may be done with a cutting device operated synchronously with the rollers feeding the sheets forward. By means of the said cutting device the plastic film is cut preferably a few millimetres behind the rear margin of a carton sheet within an area in which the plastic film does not adhere to any one of the two subsequent sheets.

The invention is chiefly meant to be applied in connection with sheets having a length of 1 metre, the said end overlapping being selected with a dimension of 1 centimetre. Of course, the invention may also be applied to sheets of smaller size.

The invention will be described in greater detail in the following with reference to the accompanying drawings showing a device chosen by way of example for carrying out the method according to the invention as well as two overlapping sheets before and after the cutting of the plastic film.

Figure 2:
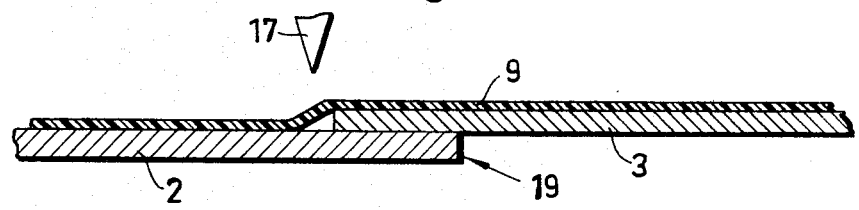
Figure 3:
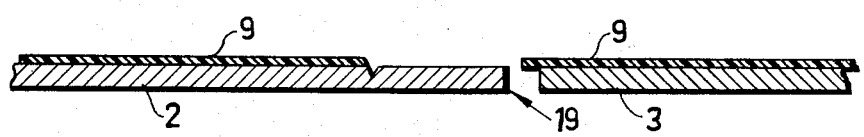

FIG. 1 shows the said device, and
FIGS. 2 and 3 show the sheets before and after the cutting of the plastic film, respectively.

As shown in FIG. 1, the end overlapped sheets 1, 2 and 3 may be fed into a plastic coating device between two feeding rollers 4 and 5. The sheets are preferably of carton material. Before and after passing the rollers 4 and 5, the adjoining ends of adjacent sheets are overlapped within an area 6 which will ultimately establish the uncoated marginal zone at the end of each sheet after a transverse cutting operation through the continuous plastic coating. The end overlapped sheets are fed into the roller nip between a rubber roller 7 and a steel roller 8 functioning as a cooling roller. At the same time a plastic film 9 extruded from a diagrammatically shown orifice 10 is fed into the nip. Reference numerals 11 and 12 designate two supporting rollers which are meant to facilitate the feeding of the sheets through the machine. Of course, additional rollers of this kind may be provided, or these rollers may be exchanged for other guiding means, such as guiding rails, chains, bands, etc.

There is a risk that the plastic film 9 will adhere to the cooling roller 8. In order to prevent this, a suction roller 13 is provided in the shown device for the purpose of removing the sheets from the cooling roller by suction. The suction roller 13 may for instance consist of a perforated jacket 14 running via a suction chamber 15, which is connected to a vacuum source.

In order to cut the plastic film 9, a cutting roller 16 having a cutting device 17 is provided in the present device. A steel roller 18 functions in the embodiment shown as an abutment for the said cutting device 17. The circumference of the cutting roller 16 may be given the same size as the length of the sheets 1 to 3.

As shown in FIGS. 2 and 3, the plastic film 9 is cut transversely of the sheet a few millimetres behind the rear margin of the sheet 3. Within this area the plastic film 9 does not adhere to any of the sheets 2 and 3. As is best shown in FIG. 3, a margin 19 at the end of sheet 2 is obtained after the cutting operation, which is completely free from plastic and is consequently a suitable guiding means at the subsequent processing of the sheet.

Of course, the invention is not restricted to the embodiment described above but may be varied within the scope of the appended claims. Thus, the various details of the device shown may be exchanged for equivalent means. The cutting device 17 may for instance consist of cutting means having a purely vertical motion and operating against an abutment completely separated from the suction roller 13. In addition, the device shown diagrammatically in FIG. 1 may be supplemented with guiding and control means of various kinds. The suction roller 13 may be exchanged for a number of orifices provided on a suitable swinging arm. The said arm is preferably made exchangeable with a predetermined length for each sheet length. This makes it possible to cause the arm to operate synchronously with the machine and grip each sheet near its front end margin and pull it loose from the cooling roller 8. If the thickness of the film 9 is greater, its strength may sometimes be sufficient for pulling loose the film from the cooling roller. Normally, however, a film thickness of about 15 to 20 gr./sq.m. is used when the material consists of polyethylene. In that connection it will be necessary to use some kind of separating device at least in connection with polished rollers. Where the rollers are not polished the problems will be less in that respect.

In lieu of using a cutting device to cut transversely through the plastic film to effect separation of adjacent sheets which have been temporarily connected together by the overlying plastic film at the overlapped end portions of adjacent sheets, the sheets may be severed by accelerating the sheets subsequent to leaving the laminating zone thereby stretching and pulling the plastic apart at the zone immediately behind the trailing edge of a sheet where it is not adhered to either of the end overlapped sheets. To facilitate this pulling apart operation, the plastic film may be perforated in this zone by a line of perforations extending parallel with the end edge of the sheet.

I claim:

1. The method of producing plastic coated sheets of carton material which comprises the steps of feeding the sheets longitudinally of themselves in succession with the end portions of adjacent sheets in overlapped relation thereby to establish a marginal zone at one end of each sheet which is desired to remain uncoated, extruding a continuous plastic film onto one side of the end overlapped sheets which thereby serves to temporarily interconnect adjacent sheets, and thereafter separating said interconnected sheets by severing said plastic film transversely of the sheets along a zone adjacent an end of one sheet where the film is not adhered to either sheet.

2. The method of producing plastic coated sheets of carton material as defined in claim 1 wherein the leading end of one sheet is inserted below the trailing end of a preceding sheet to establish the desired overlap whereby said uncoated marginal zone is established on said leading end of each sheet.

3. The method of producing plastic coated sheets of carton material as defined in claim 1 wherein the step of separating said interconnected sheets by severing said plastic film is performed by a cutting operation.

4. The method of producing plastic coated sheets of carton material as defined in claim 1 wherein the step of separating said interconnected sheets by severing said plastic film is performed by accelerating each sheet which serves to pull the coating apart at said non adhering zone.

5. The method of producing plastic coated sheets of carton material as defined in claim 4 and which includes the further step of perforating said plastic coating transversely at said non adhering zone prior to accelerating the sheet to pull the plastic coating apart.

6. Apparatus for producing plastic coated sheets of carton material which comprises feed roller means for feeding said sheets longitudinally of themselves in succession with the end portions of adjacent sheets in overlapped relation, a pair of rollers establishing a nip into which said sheets are fed along with an extruded plastic film thereby to establish a laminated structure, one of said rollers being made of rubber and contacting one side of the sheets and the other roller being made from steel and contacting the surface of the extruded plastic film so as to cool the same, a suction roller engaging the said one side of said sheets just prior to leaving said steel roller so as to pull the plastic film away from said steel roller, and means for thereafter severing said plastic film transversely of said sheets along a zone adjacent an end of one sheet where the film is not adhered to either sheet as a result of the overlap.

7. Apparatus as defined in claim 6 for producing plastic coated sheets of carton material wherein said means for severing said plastic film is constituted by a cutting device the operation of which is synchronized with the longitudinal movement of said sheets.

References Cited
UNITED STATES PATENTS 3,340,124  9/1967  Lowe et al. _____ 156—244

BENJAMIN R. PADGETT, Primary Examiner

H. E. BEHREND, Assistant Examiner

U.S. Cl. X.R.

156—157, 252, 269, 500, 516